(12) United States Patent
Paridaans

(10) Patent No.: US 10,597,276 B2
(45) Date of Patent: Mar. 24, 2020

(54) METHOD FOR CONTROLLING A BOTTLER BURST HANDLING PROTOCOL OF A CONTAINER FILLING DEVICE AND A DUMMY CONTAINER APPLIED THEREFOR

(71) Applicant: Anheuser-Busch InBev S.A., Brussels (BE)

(72) Inventor: Frans Paridaans, Leuven (BE)

(73) Assignee: Anheuser-Busch InBev S.A., Brussels (BE)

( * ) Notice: Subject to any disclaimer, the term of this patent is extended or adjusted under 35 U.S.C. 154(b) by 74 days.

(21) Appl. No.: 15/571,017

(22) PCT Filed: Jun. 6, 2016

(86) PCT No.: PCT/EP2016/062781
§ 371 (c)(1),
(2) Date: Oct. 31, 2017

(87) PCT Pub. No.: WO2016/193495
PCT Pub. Date: Dec. 8, 2016

(65) Prior Publication Data
US 2018/0162709 A1 Jun. 14, 2018

(30) Foreign Application Priority Data
Jun. 5, 2015 (EP) ..................................... 15170922

(51) Int. Cl.
*B67C 3/02* (2006.01)
*G01M 13/00* (2019.01)
(Continued)

(52) U.S. Cl.
CPC .............. *B67C 3/007* (2013.01); *B65B 57/00* (2013.01); *G01M 13/00* (2013.01); *B65B 43/54* (2013.01); *B67C 3/24* (2013.01); *B67C 3/26* (2013.01)

(58) Field of Classification Search
CPC .. B67C 3/007; B67C 3/24; B67C 3/26; B65B 43/54; B65B 57/00; G01M 13/00
See application file for complete search history.

(56) References Cited

U.S. PATENT DOCUMENTS 3,751,973 A * 8/1973 Strauss .................... G01M 3/02
73/45
3,771,649 A * 11/1973 Strauss .................... G01N 3/12
209/3.1
(Continued)

FOREIGN PATENT DOCUMENTS

JP 2005 153885 6/2005

*Primary Examiner* — Nicolas A Arnett
(74) *Attorney, Agent, or Firm* — Levy & Grandinetti

(57) ABSTRACT

A dummy container for controlling a container filling device includes a base, a housing, a locking mechanism, and an actuating mechanism. The housing is attached to the base and is movable in view of the base between a first extended position and a second collapsed position. The housing defines a fluid inlet extending into a pressure chamber. The locking mechanism is arranged between the housing and the base allowing locking of the housing in the first extended position in view of the base. The actuating mechanism is designed to release the locking mechanism between the base and housing upon a pressure increase in the pressure chamber, thereby triggering the movement of the housing into the second collapsed position in view of the base.

12 Claims, 1 Drawing Sheet

(51) Int. Cl.
 *B67C 3/00* (2006.01)
 *B65B 57/00* (2006.01)
 *B65B 43/54* (2006.01)
 *B67C 3/24* (2006.01)
 *B67C 3/26* (2006.01)

(56) References Cited

U.S. PATENT DOCUMENTS

| | | | | |
|---|---|---|---|---|
| 3,894,424 | A * | 7/1975 | Taylor | G01N 3/12 73/49.2 |
| 3,955,402 | A * | 5/1976 | Harvill | G01N 3/12 73/37 |
| 3,958,448 | A * | 5/1976 | Willis | G01N 3/12 73/37 |
| 4,285,230 | A * | 8/1981 | Hartness | G01N 3/12 73/37 |
| RE31,385 | E * | 9/1983 | Schmidt | G01N 3/12 73/37 |
| 7,543,479 | B2 * | 6/2009 | Thomas | G01M 3/3263 73/37 |

\* cited by examiner

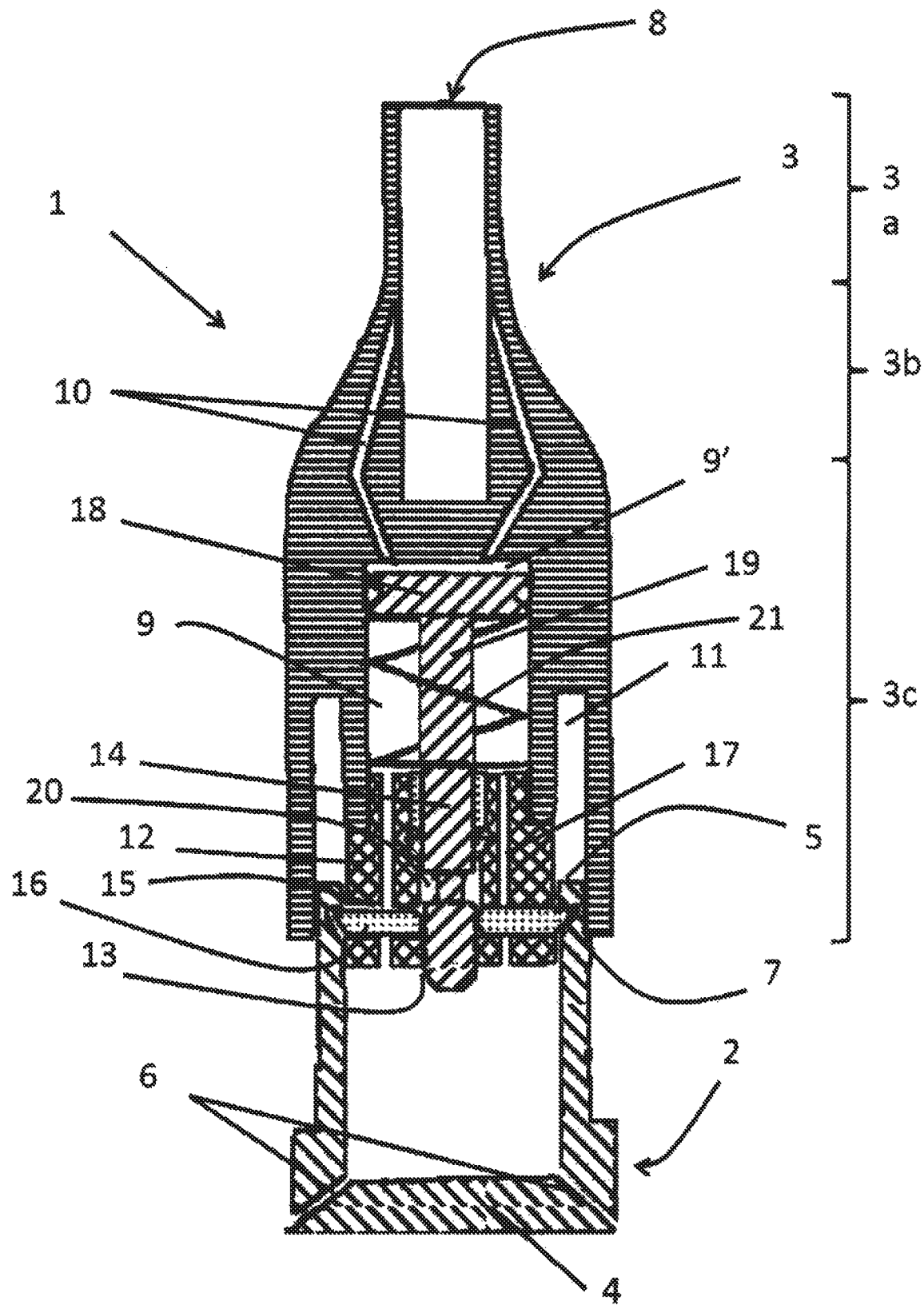

METHOD FOR CONTROLLING A BOTTLER BURST HANDLING PROTOCOL OF A CONTAINER FILLING DEVICE AND A DUMMY CONTAINER APPLIED THEREFOR

FIELD OF THE INVENTION

The present invention concerns a method for controlling a bottle burst handling protocol of a container filling device and a dummy container applied therefor.

BACKGROUND OF THE INVENTION

Bottle burst detection is a critical control point in bottle filling devices for preventing glass splinters being present in filled and capped bottles. Bottle burst itself can not be prevented during an industrial filling operation wherein a large number of bottles is filled with a pressurised liquid at very high speed. The burst of bottles occasionally occurs due to small defects in the bottle construction decreasing the pressure resistance of the bottle. In case bottle burst occurs, glass splinters are spread all around the bursted bottle, some of which splinters may end up in bottles on the transport line in proximity of the bursted bottle. In order to prevent commercializing bottles that might comprise glass splinter, the bottle filling device is equipped with sensors detecting bottle burst and is programmed with a burst bottle handling protocol that automatically rejects bottles that were located in the proximity of the bursted bottle.

At present, the bottle burst handling protocol is tested on a regular basis (every 2-3 hours in industrial filling lines) by introduction of a weakened bottle in the device. The weakened bottle will burst upon filling and should then trigger the burst bottle handling protocol. The major inconvenience of this process is that glass splinters are actually spread, which includes a potential hazard for the device operators and which necessitates cleaning of the workspace after each test. Also creating a weakened bottle brings a potential hazard for the device operator.

Another known method of controlling the bottle burst protocol includes electronically activating the bottle burst detectors without the detectors actually detecting bottle burst and as such initiating the bottle burst handling protocol. Although such method allows controlling the protocol without creating glass splinters, it has the drawback that the sensors are not actually tested and hence offers no full guarantee on the exact functioning of the bottle burst handling as is expected at a critical control point in the production line.

It is clear from the above that there remains a need for a control method that overcomes the above stated inconveniences and drawbacks.

SUMMARY OF THE INVENTION

The present invention addresses the above identified needs and provides for a dummy container for controlling a container filling device, the container comprising:
  a base;
  a housing attached to the base and movable in view of the base between a first extended position and a second collapsed position, the housing defining a fluid inlet extending into a pressure chamber;
  locking means arranged between the housing and the base allowing locking the housing in the first extended position in view of the base; and
  actuating means designed to release said locking means between the base and housing upon a pressure increase in the pressure chamber, thereby triggering the movement of the housing into the second collapsed position in view of the base.

The present invention also concerns a method for controlling a container burst handling protocol of a container filling device, said method comprising the steps of:
  providing a dummy container according to the present invention on a transport line at an inlet of the container filling device;
  transporting the dummy container to a filling station and coupling a fluid valve to the fluid inlet of the dummy container;
  introducing a fluid in the pressure chamber thereby increasing pressure in the pressure chamber to a pressure level at which the dummy container collapses, thereby activating container burst detection sensors and initiating the container filling device's container burst handling protocol; and
  controlling correct execution of the container burst handling protocol.

BRIEF IDENTIFICATION OF THE DRAWING

FIG. 1 illustrates a preferred embodiment of a dummy container according to the present invention.

DETAILED DESCRIPTION OF A PREFERRED EMBODIMENT

As illustrated in FIG. 1, the dummy container 1 according to the invention comprises a base 2 and a housing 3 movably attached to the base 2.

In the represented embodiment, the base comprises a tubular body closed at one end 4 and open at an opposite end 5. The base preferably comprises one or more drainage holes 6 in proximity of the closed end and in this case comprises a series of recesses 7 in the inner surface of the tubular body in proximity of the open end 5.

The housing 3 is in this case bottle shaped comprising a neck portion 3a defining a fluid inlet 8; a shoulder portion 3b; and a body portion 3c defining a central space 9 in fluid communication with the fluid inlet 8 through a series of channels 10. In the body portion, peripheral of the central space a angular opening 11 is provided matching the diameter of the tubular body of the base and acting as a guide for the base in the housing.

At the end of the housing facing the base, a bushing 12 is provided in the central opening and fixed to the housing 3. The bushing defines a central aperture 13 through which a piston 14 extends. In the bushing a series of slots 15 is provided housing latches 16 designed to cooperate with the series of recesses 7 in the inner surface of the base 2. Finally, the bushing preferably defines a series of drainage channels 17 extending longitudinally through the bushing parallel to the central aperture 13.

The piston 14 comprises a piston head 18 situated in the central opening of the housing and sealingly engages the inner surface of said central opening 9 such as to define a pressure chamber 9' between the inner surface of said central opening and the surface of the piston head 18 facing away from the base of the dummy container, whereby the pressure chamber 9' is in fluid communication with the fluid inlet 8 of the container.

The piston rod 19 extends through the central aperture 13 of the bushing allowing a linear movement of the piston in a longitudinal direction X of the housing and comprises a recess 20 in proximity of its distal end. This recess 20 and the above mentioned latches 16 have dimensions such that when the latches extend into the recess 20 of the piston rod, the opposite end of the latches is retracted in the bushing and do not extend in the recesses 7 in the base 2, whereas when the latches do not extend in the recess 20 of the piston rod, the opposite end of the latches extend beyond the outer diameter of the bushing and into the recesses in the base, thereby locking the housing 3 from moving in the direction X in view of the base. As such the latches 16 and the recesses 7 in the base cooperate to provide a locking means arranged between the housing and the base allowing locking the housing in view of the base in a first extended position, whereas the recess 20 in the piston rod acts as a actuating means designed to release the locking means when a pressure is applied on the housing 3 in a direction X towards the base.

The dummy container finally comprises a spring 21 arranged between the bushing 12 and the piston head 18, biasing the piston head in the X direction in a sense towards the neck portion of the housing.

The dummy container and in particular the base and housing thereof are preferably manufactured from a pressure resistant, chemically inert and easy to clean material such as aluminium, yet other metal materials or polymeric material, optionally reinforced polymeric materials can also be used.

The functioning of the dummy container is easy and as follows.

Before use, the dummy container is armed by sliding the housing in the X direction out of the base until the latches 16 snap into the recesses 7 in the base. The housing is now in a first extended position, with the piston situated in the first position such that the pressure chamber is small and the spring 21 extended. By subsequently coupling a the neck of the housing to a fluid valve of a container filling device and introducing a fluid, eg. $CO_2$ gas in the dummy container, the pressure in the pressure chamber increases and the piston is forced towards the base against the force exerted by the spring 21. At a given pressure in the pressure chamber, eg. at about 2.6 bar—which is below the maximal pressure occurring during normal filling of a container by the container filling device—, the piston head is moved to the extend that the recess 20 in the piston rod is in line with the slots 15 in the bushing such that the latches 16 are forced into said recess 20 and release the locking between the housing and the base. As a result of the pressure in the pressure chamber and the force exerted by the spring 21 on the bushing, the housing thereby linearly moves (downwards) towards the base into a second collapsed position.

Upon removal from the container filling device, the dummy container can be re-armed by manually sliding the housing in view of the base to the extended position for re-use.

When applied on an industrial container filling line equipped with sensors for detecting container burst, the sensors will detect the collapsing of the dummy container as a bottle burst and activate a bottle burst handling protocol well known in the art whereby containers in proximity of the bursted bottle or, in this case, collapsed dummy container will be rejected from the line, preventing packaging of said containers.

The dummy container according to the invention is very useful for controlling the bottle burst handling protocol of container filling devices and in particular for filling devices wherein glass bottles are filled. Indeed, by testing the bottle burst handling protocol of such device with the dummy container according to the invention, the bottle burst handling protocol can be controlled including the correct functioning of the bottle burst detection sensors and without generating container fragments such as glass splinters during testing, even better, without destructing the dummy container.

The invention claimed is:

1. A dummy container for controlling a container filling device comprises:
   a base;
   a housing attached to the base and movable in view of the base between a first extended position and a second collapsed position, the housing defining a fluid inlet extending into a pressure chamber;
   a locking mechanism arranged between the housing and the base allowing locking the housing in the first extended position in view of the base; and
   actuating mechanism designed to release said locking mechanism between the base and housing upon a pressure increase in the pressure chamber, thereby triggering the movement of the housing into the second collapsed position in view of the base;
   the locking mechanism comprises latches which slide laterally from a locked position wherein the latches engage in a recess provided in the base to an unlocked position wherein the latches retract into a recess provided in the actuating mechanism;
   the actuating mechanism comprises:
   a piston movably arranged in the housing between a first and second position, said piston comprises a piston head sealingly engaging the housing and defining said pressure chamber together with the housing; and
   a biasing mechanism for biasing the piston head towards the first position, the biasing mechanism positioned in the housing portion of the dummy and encircling the piston.

2. The dummy container according to claim 1 wherein the force exerted by the biasing mechanism on the piston is overcome by an introduction of a fluid into the pressure chamber at a pressure in the range of 1 to 6 bar.

3. The dummy container according to claim 2 comprises a guide between the housing and the base.

4. The dummy container according claim 3 wherein the container is made of metal or made from a polymeric material.

5. A method for controlling a container burst handling protocol of a container filling device comprises the steps of:
   providing a dummy container as recited in claim 4 on a transport line at an inlet of the container filling device;
   transporting the dummy container to a filling station and coupling a fluid valve to the fluid inlet of the dummy container;
   introducing a fluid in the pressure chamber thereby increasing pressure in the pressure chamber to a pressure level at which the dummy container collapses, thereby activating bottle burst detection sensors and initiating the container filling device's container burst handling protocol; and
   controlling a correct execution of the container burst handling protocol.

6. The method according to claim 5, involving activation of the container burst detection sensors without direct triggering of said sensors electronically and without destructing the dummy container.

7. The method according to claim 6, wherein the container filling device is a bottle filling device.

8. The dummy container according to claim 1 comprises a guide between the housing and the base.

9. The dummy container according to claim 1 wherein the container is made of metal or made from a polymeric material.

10. A method for controlling a container burst handling protocol of a container filling device comprises the steps of:
   providing a dummy container as recited in claim 1 on a transport line at an inlet of the container filling device;
   transporting the dummy container to a filling station and coupling a fluid valve to the fluid inlet of the dummy container;
   introducing a fluid in the pressure chamber thereby increasing pressure in the pressure chamber to a pressure level at which the dummy container collapses, thereby activating bottle burst detection sensors and initiating the container filling device's container burst handling protocol; and
   controlling a correct execution of the container burst handling protocol.

11. The method according to claim 10, involving activation of the container burst detection sensors without direct triggering of said sensors electronically and without destructing the dummy container.

12. The method according to claim 10, wherein the container filling device is a bottle filling device.

* * * * *